Jan. 8, 1924.

A. O. VESTINE

WHEEL CONSTRUCTION

Filed Oct. 8, 1921

1,479,945

Inventor.
Andrew O. Vestine
by Heard Smith & Tennant
Attys.

Patented Jan. 8, 1924.

1,479,945

UNITED STATES PATENT OFFICE.

ANDREW O. VESTINE, OF WATERTOWN, MASSACHUSETTS, ASSIGNOR TO WATERTOWN PRESSED STEEL COMPANY, OF WATERTOWN, MASSACHUSETTS, A CORPORATION OF MASSACHUSETTS.

WHEEL CONSTRUCTION.

Application filed October 8, 1921. Serial No. 506,511.

*To all whom it may concern:*

Be it known that I, ANDREW O. VESTINE, a citizen of the United States, and resident of Watertown, county of Middlesex, State of Massachusetts, have invented an Improvement in Wheel Constructions, of which the following description, in connection with the accompanying drawing, is a specification, like characters on the drawing representing like parts.

This invention relates to improvements in vehicle wheels, and particularly wheels of the type shown in United States Letters Patent No. 1,196,408, granted to me August 29, 1916, and the object of the present invention is to provide a wheel of this general type which will be of a more rigid construction than has heretofore been produced.

A further object of the invention is to provide a wheel of this type comprising a hub having anti-friction bearings which can be more easily constructed and more readily assembled than has heretofore been possible.

A further object of the invention is to provide a wheel hub construction comprising a barrel enclosing a circumferential series of anti-friction members in which the anti-friction members can be readily assembled and retained in proper position within the hub barrel, thus enabling such hub barrels to be retained in storage in assembled condition until required for use in the production of the completed wheel.

These and other objects and features of the invention will more fully appear from the following description and the accompanying drawings and will be pointed out in the claims.

A preferred embodiment of my invention is illustrated in the accompanying drawing, in which, Fig. 1 is a side elevation of a wheel containing my invention;

Figure 1:
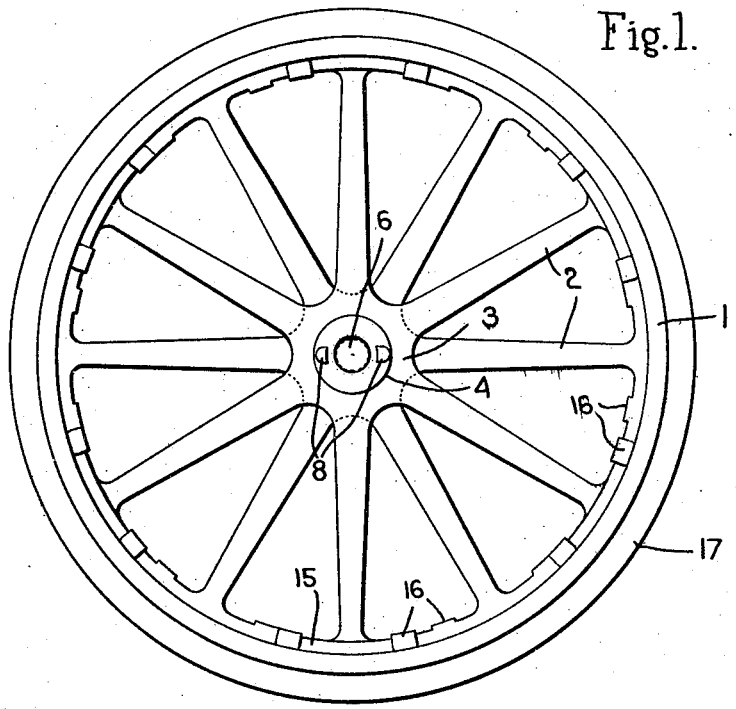

The particular embodiment of the invention disclosed herein is illustrated as applied to a wheel having a body formed of sheet metal. The body comprises two complementary members formed of sheet metal each member comprising a rim section 1, spokes 2, and a central hub member 3. The hub members 3 preferably are provided with central cylindrical offset portions 4 which are maintained in separated position by a spacing sleeve or barrel 5 so that the spokes 3 converge toward the rim of the wheel. Either or both of the hub members 4 may be provided with a central circular aperture 6 to receive the axle of the wheel, and the hub members desirably are provided with apertures 7 located at a predetermined distance from the center of the hub portions to receive locking members, preferably in the form of tongues 8, adapted to be bent over or otherwise deformed to lock the hub members firmly against the ends of the barrel. By reason of this construction a very rigid wheel hub structure is produced whereas in previous constructions, in which the hub members fitted upon the ends of the barrel, excessive weight upon the wheel would cause sufficient spreading of the hub members to disengage the same from the end of the barrel.

In the particular hub construction illustrated herein a series of anti-friction rollers 9 are provided which are arranged circumferentially within the chamber of said barrel. The ends of the rollers 9 desirably are reduced, preferably presenting tapered ends 10, and means desirably are provided to retain the rollers in their circumferential arrangement.

Figure 4:
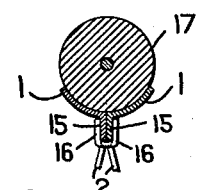
Fig. 4 is a transverse sectional view through the rim sections of the wheel showing also a tire, cylindrical in cross section, assembled upon the wheel rim.
Figure 3:
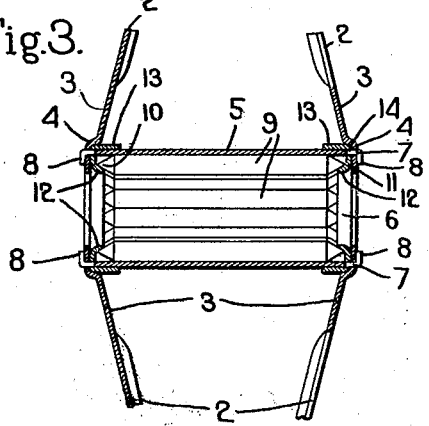
Fig. 3 is a detail longitudinal sectional view through the barrel and the hub members of the wheel.
Figure 2:
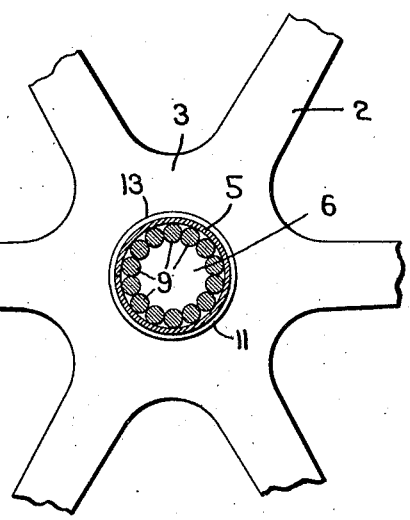
Fig. 2 is a detail view showing the barrel of the hub and anti-friction rollers in section.

In the preferred embodiment of the invention illustrated herein the retaining members are in the form of caps 11 interposed between the hub members 3 of the body of the wheel and the ends of the barrel 5, said retaining members being provided with inturned lips 12 which underlie the reduced ends of the anti-friction rollers 9. Preferably the retaining members are provided with flanges 13 which embrace the end portions of the barrel. The retaining members 11 are provided with apertures or slots 14 adapted to register with the slots 7 in the hub member in order that the tongues 8 which extend from the ends of the barrel may pass through. By reason of this construction the barrel, retaining caps and hub members may be rigidly locked in assembled position. Furthermore, this construction provides for the assembly of the anti-friction rollers in the barrels before the barrel is assembled in the wheel, so that the assembled barrels can be easily stored until needed. In thus assembling the anti-friction rollers within the barrels one of the retaining caps is placed upon the end of the barrel and is held in place not only by the circumferential flange 13 which embraces the end of the barrel, but also by the tongue which projects through the aperture or slot in the cap. The rollers may then be inserted in the barrel and the other cap applied and pressed into position. When it is desired to assemble the entire wheel the body portions of the wheel are applied to the ends of the barrel in such a manner that the tongues 8 extend through the apertures 7 in the hub members. The projecting ends of the tongues are then bent downwardly as illustrated in Fig. 3, or otherwise deformed in such a manner as to lock the hub members firmly against the ends of the barrel, clamping the retaining members for the anti-friction rollers therebetween. When this is accomplished the rim sections 1 of the wheel are brought together as illustrated in Fig. 4.

Each of the rim sections preferably is provided with a flange 15 which is provided at intervals with a locking member or tab 16 adapted to be bent over the flange of the complementary rim section and preferably to enter a suitable recess in said complementary member as more fully described in my prior patent aforesaid. The rim sections 1 may be of any desired contour to receive a suitable tire. As illustrated herein each of the rim sections presents an arcuate surface so that the rim members when assembled are adapted to receive a tire 17 of circular cross section which may be applied in the usual way. The spokes of the wheel may be of any desired contour.

It will be observed that by reason of the construction above described a very rigid wheel structure is secured since the hub members are firmly anchored to the ends of the barrel and the rim sections are firmly locked together by the interengaging locking members or tabs. While the present invention is illustrated as applied to a wheel comprising a body formed of sheet metal it will be understood that it may be embodied in other forms of wheels.

It will, therefore, be understood that the particular embodiment of the invention disclosed herein is illustrative and not restrictive and that various modifications in form, construction and arrangement of parts may be made within the spirit and scope of the following claims.

Having thus described my invention, what I claim as new, and desire to secure by Letters Patent, is:

1. A wheel comprising a pair of complementary hub members, a tubular barrel intermediate of said hub members having at its ends locking means positively interengaging said hub members, anti-friction means circumferentially arranged within the chamber of said barrel and means for retaining said anti-friction means in said circumferential arrangement secured in position by said locking means.

2. A wheel comprising a pair of complementary hub members having apertures located at predetermined distances from their centers, a barrel intermediate of said hub members having at its ends tongues engaging said apertures and operable when deformed to lock said hub members upon said barrel, a series of anti-friction members circumferentially arranged within the chamber of said barrel and means for retaining said anti-friction members in circumferential arrangement, secured in position by the interengagement of said barrel and hub members.

3. A wheel comprising a pair of complementary hub members having apertures located at predetermined distances from their centers, a tubular barrel intermediate of said hub members having integral tongues extending through the apertures in said hub members and operable when deformed to lock said hub members upon said barrel, a series of rollers having reduced end portions circumferentially arranged within the chamber of said barrel and retaining caps engaging the ends of said barrels having apertures to receive said tongues and clamped thereupon by the said hub members and having lips underlying the tapered ends of said rollers.

In testimony whereof, I have signed my name to this specification.

ANDREW O. VESTINE,